April 7, 1936. J. E. PADGETT 2,036,955
SHOCK ABSORBING DEVICE
Filed March 2, 1933 3 Sheets-Sheet 2

INVENTOR:
JOSEPH E. PADGETT
Kevin Hudson & Kent
ATTORNEYS

April 7, 1936.　　　　J. E. PADGETT　　　　2,036,955
SHOCK ABSORBING DEVICE
Filed March 2, 1933　　　3 Sheets-Sheet 3

INVENTOR:
JOSEPH E. PADGETT.
ATTORNEYS

Patented Apr. 7, 1936

2,036,955

UNITED STATES PATENT OFFICE 2,036,955

SHOCK ABSORBING DEVICE

Joseph E. Padgett, Toledo, Ohio, assignor, by mesne assignments, to General Motors Corporation, Detroit, Mich., a corporation of Delaware Application March 2, 1933, Serial No. 659,419

10 Claims. (Cl. 188—88)

This invention relates to shock absorbing devices and, more particularly, to an improved construction for shock absorbers of the hydraulic type.

As one of its objects my invention aims to provide a shock absorber, of the hydraulic type, embodying novel means for controlling the displacement of liquid such that a substantially constant shock absorbing action is obtained regardless of changes in the viscosity of the liquid.

Another object of my invention is to provide a shock absorber, of the type referred to, wherein the displacement of liquid is controlled by the use of an orifice of such form that very little frictional resistance is offered to the passage of liquid therethrough.

A further object of my invention is to provide novel fluid flow control means, adapted to be embodied in various forms of shock absorbers of the hydraulic type, and comprising an orifice having a relatively thin edge such that the discharge of liquid through the orifice is substantially independent of viscosity changes in the liquid.

It is also an object of my invention to provide an improved hydraulic type shock absorber embodying novel means for preventing leakage of fluid while the device is being shipped or is in storage; and wherein novel means is provided for eliminating air from the working cylinder; and wherein novel means is provided for charging the device with a desired body of fluid.

Other objects and advantages of my invention will be apparent from the following description when taken in conjunction with the accompanying sheets of drawings wherein.

Detailed reference will now be made to the accompanying drawings, wherein I have illustrated a preferred form of shock absorber embodying the novel flow control means of my invention, and have also shown my novel flow control means embodied in several other shock absorbers of the fluid displacement type. The drawings are intended to be illustrative of the principle of my invention, and although they indicate a wide range of applicability of the invention to different constructions of shock absorbers of the hydraulic type, it should be understood however that they by no means show all of the devices with which the invention may be used.

Figures 1, 17:
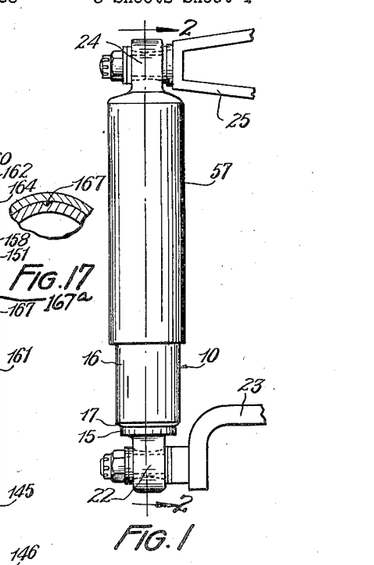
Fig. 1 is an elevational view showing my invention embodied in a shock absorber of the direct acting type.
Fig. 17 is a detail sectional view taken on line 17—17 of Fig. 16.
Figure 2:
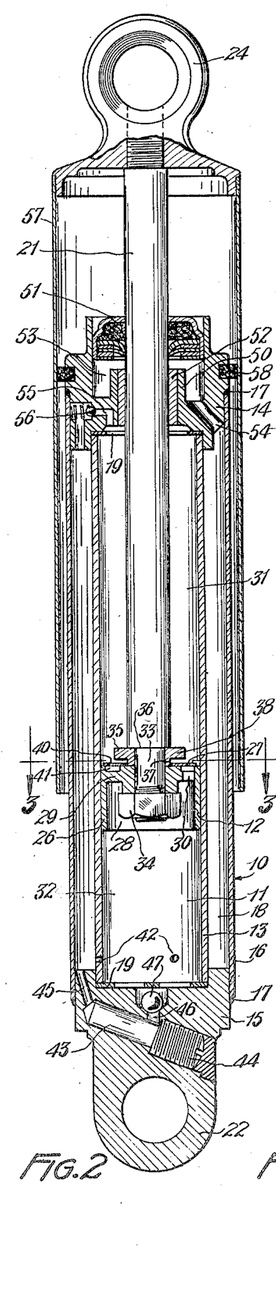
Fig. 2 is a longitudinal sectional view taken substantially on line 2—2 of Fig. 1.
Figure 3:
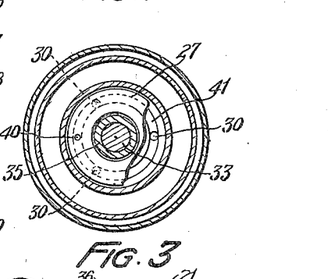
Fig. 3 is a transverse sectional view taken on line 3—3 of Fig. 2.
Figure 4:
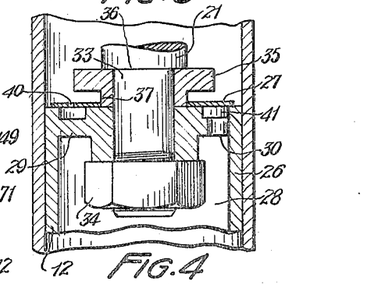
Fig. 4 is a sectional view on an enlarged scale showing my novel flow controlling orifice.

A preferred form of my improved shock absorber is shown in Figs. 1 and 2 of the drawings, and comprises, in general, a housing 10 having an elongated working cylinder 11 therein, and a piston 12 which is reciprocably operable in the cylinder.

The working cylinder may be constructed in any suitable manner but is preferably in the form of an elongated sleeve 13 which is closed at its ends by the plug members 14 and 15. The sleeve 13 and the plug members 14 and 15 are retained in assembled relation by means of an outer sleeve 16, which is disposed in substantially coaxial relation with the cylinder sleeve, and has its ends secured to the plug members 14 and 15, preferably by the weld indicated at 17. As shown in the drawings, the diameter of the outer sleeve 16 exceeds the diameter of the cylinder sleeve 13 by a sufficient amount to provide a reservoir 18, the purpose of which reservoir will appear hereinafter. The sleeves are preferably so proportioned as to length that in assembling the plug members 14 and 15 in the ends of the sleeves 16 the ends of the cylinder sleeve 13 may be pressed against suitable gaskets 19 to prevent leakage around the ends of the latter sleeve.

To provide for relative movement between the cylinder 13 and the piston 12 which is operably mounted therein, I employ a suitable piston rod 21 which extends into the cylinder through the plug member 14 and is operably connected with the piston.

For conveniently applying my shock absorber to a motor vehicle, or such other machine with which the shock absorber is to be used, I provide the plug member 15 with a suitable connecting portion, preferably in the form of an eye 22 which may be anchored to an available portion of the vehicle, such as an axle clip 23, and also provide the outer end of the piston rod 21 with a connecting portion, preferably in the form of an eye 24, which may be attached to another portion of the vehicle, such as a bracket 25 secured to the frame.

The piston 12 may be of any suitable form but is here shown as comprising a cup-shaped member 26, and a valve element 27 which is movable relative to the cup-shaped member. The cup-shaped member may be of metal and is preferably constructed with a skirt portion 28 which is slidably fitted in the cylinder sleeve 13, and with a transverse wall portion 29 to which the inner end of the piston rod is suitably connected. This transverse wall portion is provided with a plurality of spaced openings 30 for connecting the chambers 31 and 32, which are located above and below the piston, and into which the cylinder 11 is divided by the piston.

For convenience in connecting the piston rod with the piston 12, the inner end of the rod may be provided with a reduced portion 33 which extends through and is retained in an opening in the transverse wall of the piston by means of the nut 34. A combined guide and retaining member 35 may be provided between the transverse wall of the piston and the shoulder 36 of the piston rod. This member is provided with a reduced portion 37 forming a guide for the valve element 27 so that the latter is movable toward and away from the transverse wall for controlling the flow of liquid through the openings 30. The member 35 is also provided with a laterally extending annular flange portion 38 which limits the movement of the valve element away from the transverse wall of the piston.

The valve element 27 is provided with an orifice 40, of small cross sectional area as compared with the area of the openings 30, for restricting the flow of liquid through the piston as the latter is moved upwardly in the cylinder. To permit a free flow of liquid from the openings 30 to the orifice 40 while the valve element is in engagement with the transverse wall of the piston, I form an annular groove or recess 41 in this wall of the piston which connects the openings 30, and with which groove the orifice registers when the valve element is against the piston wall.

During use of my improved shock absorber the cylinder 11 and the reservoir 18 are charged with a suitable liquid, such as an oil, and from the arrangement of parts as described it will be seen that as the piston moves upwardly in the cylinder there is a tendency to compress the liquid in the chamber 31 thereby causing this liquid to be displaced downwardly through the orifice 40 and the openings 30 into the chamber 32. Such restricted discharge of liquid from the chamber 31 through the orifice 40 retards relative separating movement between the eye connections 22 and 24 thus producing a desired shock or energy absorbing action which may be utilized for checking the movement of the spring supported body of a vehicle. The withdrawal of the piston rod from the cylinder increases the liquid capacity of the cylinder and, to prevent the formation of a partial vacuum below the piston, additional liquid is supplied to the cylinder from the reservoir 18 through the restricted openings 42.

Upon downward movement of the piston in the cylinder, liquid in the chamber 32 is forced upwardly through the openings 30 into the chamber above the piston. During this upward flow the liquid moves the valve element 27 away from the piston and passes around the edges of the valve element and into the upper chamber of the cylinder. This movement of the valve element away from the piston is limited by the annular flange portion 38 of the member 35, such annular flange portion also providing a backing means for the valve element which prevents undesirable deflection of this element by the upwardly moving stream of liquid. The rod 21, entering the cylinder during the downward stroke of the piston, displaces some of the liquid and such displacement action, combined with the compression stroke of the piston, causes liquid to be forced out of the cylinder and back into the reservoir 18 through the restricted openings 42. It should be noted at this point that the restricted openings 42 connect the working cylinder with the reservoir at a point below the surface of the liquid standing in the reservoir so that there will be no occasion for air to be drawn into the cylinder through these restricted openings and cause an emulsion with the oil.

In shock absorbers of the hydraulic type considerable variation has heretofore been encountered in the functioning of these devices due to changes in the viscosity of the liquid such as result from temperature variations. Efforts have been made to eliminate this undesirable variation, in some instances by the use of temperature responsive means for varying the size of a metering orifice, but such temperature responsive control devices are objectionable for the reason that they add to the cost of construction of the shock absorber, and they also increase the complexity of the device and render the same less reliable in service.

I have discovered that this undesirable variable action in a hydraulic shock absorber results from the character of the flow control means heretofore employed and that such an objectionable variable action can be avoided by minimizing or substantially eliminating the frictional resistance to the passage of the liquid through the flow control means. I have discovered further that the resistance to the passage of liquid through the flow control means of hydraulic shock absorbing devices, as heretofore constructed, is made up principally of two factors, namely the resistance to flow represented by the restricted cross sectional area of the passage which connects the liquid chambers, and the friction of the fluid in the passage. In my improved shock absorbing devices I have minimized or substantially eliminated the friction factor by eliminating a passage of substantial length and by employing as the control port or orifice 40 which, in this instance, is located in the valve element 27, an orifice which for convenience can be referred to as a "thin wall orifice".

I have found, further, that it is characteristic of shock absorbers of the hydraulic type, that the friction factor of the resistance offered to the flow of liquid through the control passage connecting the fluid chambers, is dependent upon the viscosity of the liquid. Moreover, I have found that the flow of liquid through an orifice, of the type which I employ, is determined largely by the cross sectional area of the orifice and the pressure of the liquid, and is substantially independent of the viscosity of the liquid and of changes in the viscosity of the liquid. It will accordingly be seen that by eliminating a passage of substantial length through which the liquid must pass in being displaced from the pressure chamber, the objectionable friction factor of the flow control means is rendered negligible, and since the flow of liquid through the orifice is substantially independent of the viscosity changes a substantially constant shock absorbing action is obtained, which for all practical purposes, is independent of temperature variations.

I employ the above described principle in the piston of my improved shock absorber, preferably by constructing the valve element 27 as a relatively thin disc of metal, or other suitable material, such that the thickness of this disc, or at least that portion of the disc which forms the side wall of the orifice, is approximately one-fourth of the diameter of the orifice 40. It is not necessary that the body forming the valve element 27 be of uniform thickness throughout its extent but it is important from the standpoint of my invention that that portion containing the orifice, be made relatively thin so that the orifice opening will be defined by what may be called a feather edge, and so that the flow controlling passage of the orifice will be very short. Thus in constructing this valve element with a thickness at the orifice which is approximately one-fourth of the diameter or plan dimension of the orifice it will be seen that the fluid passage provided by this orifice is so short that the objectionable friction factor, referred to above, is substantially eliminated during the passage of liquid from one chamber to the other through this orifice.

Although I have found that the desired substantially constant shock absorbing action is attained in a shock absorber, as illustrated in Fig. 1, when the thickness of the wall in which the orifice is formed is approximately one-fourth of the diameter of the orifice, this relation between the thickness of the wall and the diameter of the orifice may be varied for shock absorbers of different types and sizes or, to suit different conditions of service. I have found, further, in regard to the thickness of the wall in which the orifice is formed, that from the standpoint of the theoretical, a more nearly constant shock absorbing action is obtained as the thickness of the wall approaches zero as a limit. For manufacturing purposes I make this wall as thin as practicable, for example in the practical form of shock absorber illustrated in Fig. 2, the valve element 27 is approximately .015" thick and the orifice 40 is approximately .065" in diameter.

In my improved shock absorber, as illustrated in Figs. 1 and 2, it is usually desirable that the control port or orifice be in the valve element of the piston, but it will be readily seen that the principle of my invention, as just explained, is applicable to the flow control opening regardless of whether the orifice is located in the valve portion or in the piston member 26, or in some other part of the device such as a portion of the stationary wall of the cylinder 11.

With further reference to the term "thin wall orifice" which appears in the specification and claims, it should be understood that I do not employ this term in its narrow literal sense, but use it in a broader sense in which it means an orifice or port providing a relatively short flow controlling passage, without limitation as to the specific cross sectional shape or area of the passage, and without limitation as to the location of the passage nor as to the size, shape, function or location of the part in which the passage is formed. It is usually desirable that the flow controlling orifice be a round opening, but I intend the term "thin wall orifice" to include orifices of any shape or contour which may be the effective equivalent of the round orifice 40.

It will be understood of course that the area of the orifice 40 is to be determined largely by the shock absorbing action desired during the up stroke of the piston, and that the cross sectional area of the openings 30 and 42, and the area of the annular space between the outer edge of the valve element 27 and the wall of the cylinder 11, is to be determined largely by the shock absorbing action desired on the down stroke of the piston.

As explained above, the reservoir 18 is in communication with the working cylinder through the restricted openings 42, and that fluid flows into or out of the cylinder through these openings depending upon the direction of movement of the piston 12. Because of the restricted cross sectional area of these openings, they provide for a shock absorbing action on the downward stroke of the piston and, at times, the return of fluid to the working cylinder from the reservoir through these openings may take place at a slower rate than is desirable. Accordingly, if desired, a by-pass may be established around these restricted openings for returning liquid to the working cylinder at a rapid rate on the upward stroke of the piston. In this instance the by-pass includes a portion of the filling passage 43, which is normally closed at its outer end by the plug 44, and includes passages 45 and 46 connecting the ends of the filling passage, respectively, with the reservoir 18 and the chamber 32. A check valve element, in the form of a ball 47, is arranged to control the passage 46 so that on the downward stroke of the piston this check valve element is seated and all of the liquid flowing into the reservoir must pass through the restricted openings 42, but on the up stroke of the piston the valve element 47 is unseated, allowing liquid to flow back rapidly into the cylinder 11 from the reservoir 18.

As shown in Fig. 2 of the drawings the plug member 14 is provided with a bearing portion 50, through which the piston rod 21 extends, and with a packing unit 51 mounted therein outwardly of and in spaced relation to the bearing portion 50. If desired, the bearing portion may be fitted with a bushing 52 of suitable material in which the piston rod is slidable. The spacing of the packing unit 51 from the bearing portion of the plug provides the latter with a leakage collecting chamber 53 from which liquid may be returned to the reservoir through a passage 54 connecting this chamber with the reservoir. During the operation of the device, liquid escaping from the working cylinder and adhering to the piston rod is scraped from the latter by the packing and is returned to the reservoir through the passage 54.

If desired, the plug member 14 may also be provided with a by-pass 55 for returning fluid to the reservoir from the working cylinder in the event that the pressure generated in this cylinder exceeds a predetermined safe value. The by-pass 55 is controlled by a spring pressed check valve element 56 which is unseated when the pressure of the fluid in the working cylinder exceeds the predetermined safe value and then allows liquid to flow directly to the reservoir from the cylinder.

To shield the piston rod against dust, water and other foreign material, a tubular shield 57 may be mounted on this rod with a portion thereof in telescoping relation around the housing 10. Entry of foreign material between the shield and housing may be prevented by a suitable packing 58.

Figure 5:
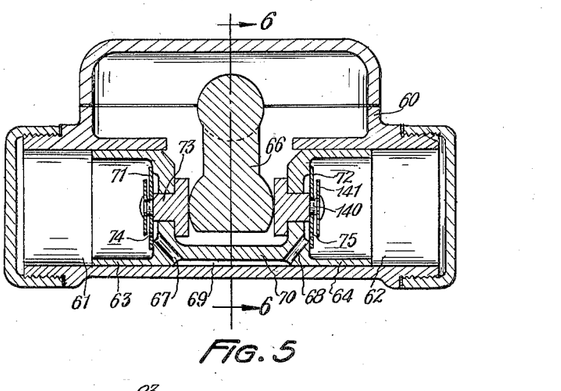
Fig. 5 is a longitudinal sectional view taken through another form of shock absorber embodying my invention.
Figure 6:
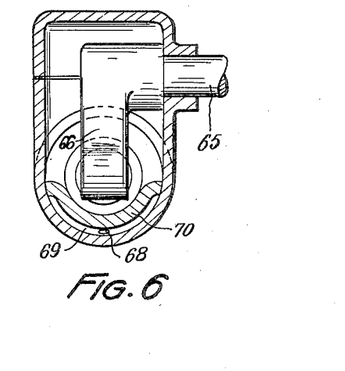
Fig. 6 is a transverse sectional view thereof taken substantially on line 6—6 of Fig. 5.

In Figs. 5 and 6 of the drawings I have shown another shock absorber, of the fluid displacement type, in which my novel fluid-flow control means is embodied. This shock absorber is shown as having a housing 60, which is provided with a pair of axially aligned cylinders 61 and 62, and a pair of connected pistons 63 and 64 which are reciprocably mounted in the respective cylinders. The housing of this shock absorber may be connected to a suitable portion of a vehicle, such as the frame and the actuating rod 65 which is operably connected with the pair of pistons by means of the lever arm 66, may be connected with another portion of the vehicle structure such as one of the axles.

The cylinders 61 and 62 are in controlled communication with each other through passages 67 and 68, formed in the pistons, and through a connecting passage 69 formed as a recess in the web 70 connecting the pistons. Transfer of fluid from one cylinder to the other is controlled by valve elements 71 and 72 which are carried by the respective pistons. These valve elements are constructed in the form of a thin metal disc which is supported on a shouldered member 73 for movement relative to the body of the piston so as to function as a check valve. The valve element 71 is provided with a control orifice 74 and the valve element 72 is provided with a similar control orifice 75. The control orifices 74 and 75, and the valve elements 71 and 72, correspond as to construction and function with the valve element 27 and the control orifice 49 of the shock absorber shown in Fig. 2 of the drawings.

When the pistons are moved toward the right hand end of the housing 60, as seen in Fig. 5, the valve element 72 is pressed against the piston 64 and the fluid displaced from the cylinder 62 passes through the orifice 75 and through the passages 68, 69 and 67 into the cylinder 61. The flow of fluid through the orifice 75 takes place at a rate which is dependent principally upon the pressure exerted on the fluid and the cross sectional area of the orifice and, according to the principle of my invention, is substantially independent of changes in the viscosity of the liquid. Upon movement of the pistons in the opposite direction in the housing 60 the liquid in the cylinder 61 is subjected to pressure causing the valve element 71 to be seated against a piston 73 and causing some of the liquid to be discharged through the orifice 74. The liquid discharged through the orifice 74 is transferred through the passages 67, 69 and 68 to the cylinder 62, the valve element 72 being moved away from the piston 64 in the nature of a check valve.

Figure 7:
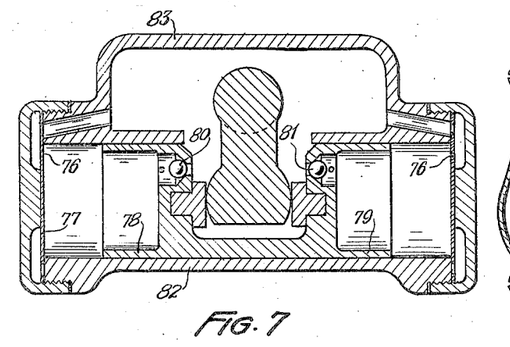
Figs. 7 to 13 inclusive are sectional views showing other shock absorbers embodying my invention.

In Fig. 7 of the drawings, I have shown another shock absorber of the fluid displacement type which is generally similar to that shown in Figs. 5 and 6, except that in this instance the "thin wall orifice" 76 is formed in a stationary part 77 instead of being formed in a movable check valve disc as in Fig. 5. In Fig. 7 the connected pistons 78 and 79 are provided respectively with movable check valve elements 80 and 81 which control the flow of fluid through the pistons.

In this form of shock absorber the movement of the piston 78 toward the adjacent end of the housing 82 causes fluid to be forced through the orifice 76 and to be transferred to the reservoir 83. During this same movement of the pistons some of the liquid in the reservoir 83 opens the check valve 81 and enters the cylinder in which the piston 79 is moving. Upon movement of the pistons in the opposite direction of piston 79 forces liquid through the orifice 76 and into the reservoir 83. At the same time some of the liquid in the reservoir 83 opens the check valve 80 and flows into the cylinder in which the piston 78 is moving. During the operation of this shock absorber the "thin wall orifice" 76 accomplishes the function, explained above, to provide a desired shock absorbing action which is substantially independent of changes in the viscosity of the liquid.

Figure 8:
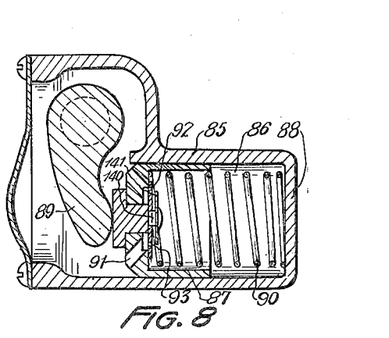
Figure 9:
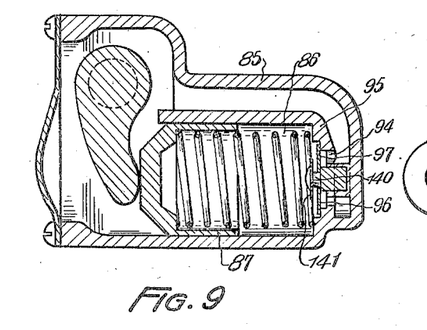

In Figs. 8 and 9 of the drawings I have shown shock absorbers of the single acting hydraulic type wherein a housing 85 is provided with a cylinder 86 in which a piston 87 is reciprocable. The piston is moved toward the closed end 88 of the cylinder by a lever arm 89, and is returned by a coil spring 90 arranged in the cylinder beneath the piston.

In the arrangement of Fig. 8 the piston is provided with one or more openings 91 for the passage of fluid into or out of the cylinder during relative movement between the piston and the cylinder wall 88. A relatively thin disc 92 is mounted on the piston to cooperate with the openings 91 in the nature of a check valve. When the piston 87 is moved away from the wall 88 by the spring 90 the valve element 92 moves away from the openings 91 and allows a relatively free flow of liquid through the latter. When the piston is moved toward the wall 88 by the lever arm 89, to effect a shock absorbing action, the valve element 92 is pressed against the top portion of the piston and a restricted flow of fluid out of the cylinder takes place through the orifice 93 of the valve element.

In the shock absorber of Fig. 9 the piston 87 is not provided with fluid passages as in Fig. 8, but equivalent fluid passages 94 are provided in the end wall 95 of the cylinder. A thin disc 96 is arranged adjacent the wall 95 to cooperate with the openings 94 in the nature of a check valve element. Upon movement of the piston away from the wall 95 liquid enters the cylinder through the openings 94, but upon movement of the piston toward the end wall to produce a shock absorbing effect, a restricted flow of fluid out of the cylinder takes place through the orifice 97 of the valve element 96.

The valve element 92 of Fig. 8 and the valve element 96 of Fig. 9, are so constructed that the orifices 93 and 97 of these valve elements, function in the manner of the "thin wall orifice" disclosed in connection with Fig. 2, which results in the attainment of a substantially constant shock absorbing action irrespective of changes in the viscosity of the liquid, incident to temperature changes or other causes.

Figure 10:
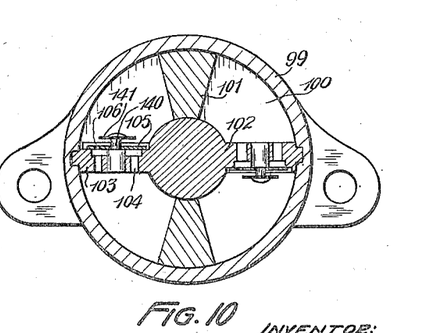
Figure 11:
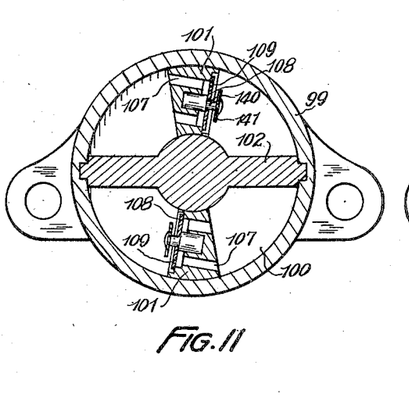

In Figs. 10 and 11 of the drawings, I have shown my invention embodied in shock absorbers of the rotary type wherein a housing 99, which is adapted to be attached to the frame or some other available portion of a vehicle, is provided with a cylinder 100 and with wing type pistons 101 for oscillation in the cylinder. The pistons may be actuated, upon relative movement between the frame and axle of the vehicle, through suitable means connecting the pistons with the axle. The cylinder 100 is divided into two working chambers by a transversely extending stationary abutment 102.

In the shock absorber shown in Fig. 10, the stationary abutment is constructed with oppositely extending wing portions 103, each of which is provided with fluid passages 104 and with a movable valve disc 105 for controlling such passages. This valve disc is constructed as a relatively thin plate and is provided with a control orifice 106 which functions in the nature of the "thin wall orifice" disclosed in connection with Fig. 2 of the drawings. Upon movement of the wing pistons 101 in a clockwise direction as seen in Fig. 10, liquid passes through the openings 104 and is transferred from one chamber to the other by the opening of the check valves provided by the discs 105. Upon movement of the wing pistons in the opposite direction, the valve elements 105 are seated against the stationary abutment wings and a restricted transfer of fluid from one chamber to the other takes place through the orifices 106 to thereby produce the desired shock absorbing action.

In the shock absorber of Fig. 11, fluid passages 107 are formed through the wing pistons 101 instead of through the stationary abutment 102. The passages 107 of the pistons are controlled by the thin discs 108, which function as check valve elements, and which are provided respectively with a control orifice 109. Upon movement of the pistons 101 in a counterclockwise direction as seen in Fig. 11, fluid is transferred from one chamber to the other through the passages 107. Upon movement of the pistons in the other direction however, the valve elements 108 are seated against the pistons and a restricted transfer of fluid takes place through the orifices 109 to produce the desired shock absorbing action. The valve elements 105 and 108, of Figs. 10 and 11, and the orifices 106 and 109 are so formed that the orifices are "thin wall orifices" and, in accordance with my invention, the shock absorbing action obtained in these devices is a substantially constant action, that is to say an action which is independent of changes occurring in the viscosity of the liquid.

In Figs. 1 to 11 of the drawings I have shown the "thin wall orifice" as being formed in a relatively thin plate which, in some instances, is a movable valve element and in other instances is a stationary wall. It is not necessary to my invention that the orifice be formed in a separate part which is constructed as a thin plate but, as shown in Fig. 12 of the drawings, may be constructed in some relatively thick part of the device.

Figure 12:
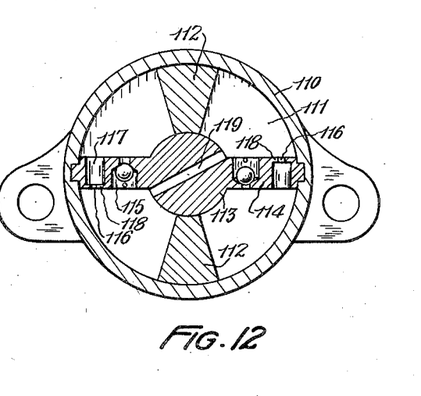

The shock absorber shown in Fig. 12 is provided with a housing 110 having a cylinder 111 therein, and with wing type pistons 112 arranged to oscillate in the cylinder. A stationary abutment 113 extends transversely of the cylinder and may be constructed with oppositely extending wing portions 114. Each of these wing portions is provided with a check valve 115 and a thin wall orifice 116.

As shown in the shock absorber of Fig. 12, the "thin wall orifice" 116 of my novel flow control means may be formed in a relatively thick part by providing such part with a counterbore or recess 117, which recess is so arranged as to leave a relatively thin web of material 118. The control orifice 116 is formed through this web 118 and upon movement of the wing pistons 112 in a clockwise direction, as seen in Fig. 12, the check valves 115 are closed and liquid is forced through the control orifices 116 to produce a desired shock absorbing effect. Upon movement of the wing pistons in the opposite direction, the check valves are opened to permit a free flow of fluid through the wing portions of the abutment. If desired, an equalizing passage 119 may be provided through the abutment 113 to permit equalization of the fluid pressures existing in the different working chambers of the device.

Figure 13:
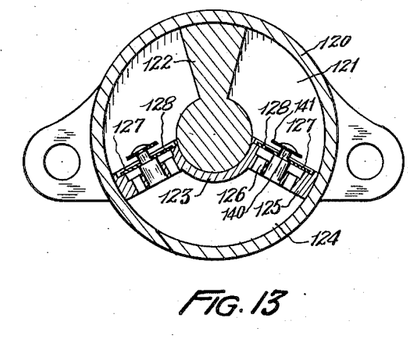

In Fig. 13 of the drawings, I have shown still another shock absorber embodying my invention and comprising, essentially, a housing 120 having a cylinder 121 therein, and a wing type piston 122 mounted for oscillation in the cylinder. A segmental hollow abutment 123 occupies a portion of the cylinder 121 and forms a liquid reservoir 124 which is separated from the working portions of the cylinder by means of the wing portions 125. These wing portions of the abutment are provided with fluid passages 126 and with a relatively thin movable disc 127 which functions as a check valve element.

The shock absorber of Fig. 13 is of the double acting type and upon movement of the piston 122 in the cylinder, the check valve element, being approached by the piston, is seated and the check valve element, from which the piston is moving, is opened to admit fluid to the cylinder from the reservoir 124. Each check valve element is provided with a control orifice 128 and upon movement of the piston toward one of the check valve elements, fluid is forced through the orifice of that element and into the reservoir 124 to produce the desired shock absorbing action. The valve elements 127 are so constructed that the orifices 128 constitute "thin wall orifices" with the result that the shock absorbing action attained in this device is constant to the extent that it is substantially independent of changes in the viscosity of the liquid.

Figure 14:
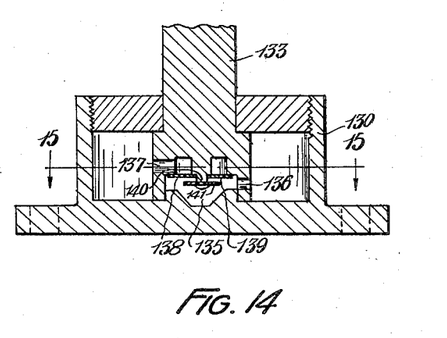
Fig. 14 is a sectional view of another shock absorber embodying my invention.
Figures 15, 18:
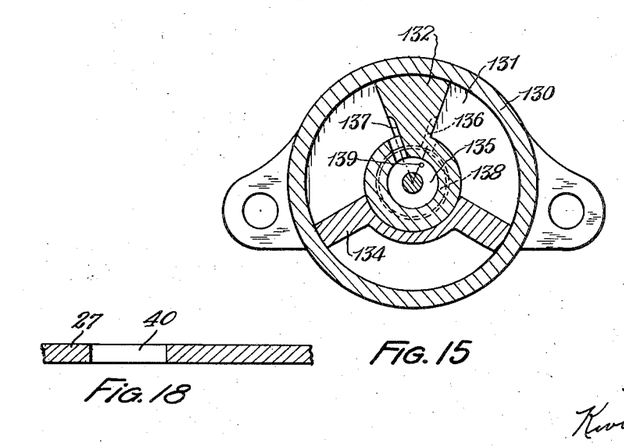
Fig. 15 is a transverse sectional view thereof taken substantially on the line 15—15 of Fig. 14.
Fig. 18 is a detached sectional view on an enlarged scale, showing the proportions of the control orifice.

In Figs 14 and 15 of the drawings I have shown another hydraulic shock absorber, of the oscillating wing piston type, wherein the fluid flow control means is arranged in the shaft which actuates the wing piston. As shown in the drawings, this shock absorber may be provided with a suitable housing 130 having a cylinder 131 therein, and with a piston 132 which is carried by a shaft 133 and arranged for oscillation in the cylinder. The cylinder is provided with a stationary abutment 134 which cooperates with the piston 132 in dividing the cylinder into two working chambers. The shaft 133 is provided with a valve recess 135 which communicates with the cylinder, on one side of the piston, through a passage 136, and with the cylinder, on the opposite side of the piston, through a passage 137. A relatively thin disc 138 is movably mounted in the valve chamber 135 to function in the manner of a check valve for controlling the transfer of fluid through the passages 136 and 137. This valve element is provided with a control orifice 139 for restricting the flow of fluid through the passages 136 and 137 to thereby produce the desired shock absorbing action.

Upon movement of the piston 132 in a counterclockwise direction, as seen in Fig. 15, fluid is forced through the passage 137 and into the valve chamber 135 by moving the valve element 138 away from its seat. From the valve chamber 135 the fluid flows freely through the passage 136 to the portion of the cylinder on the opposite side of the piston. Upon movement of the piston in a clockwise direction fluid is forced in a reverse direction through the passage 136 causing the valve element 138 to be seated. While the valve remains seated fluid is forced through the control orifice 139, and because of the restricted communication provided by this orifice, the desired shock absorbing action is produced. The valve element 138 is so formed that the orifice 139 is a "thin wall orifice", and the shock absorbing action obtained in this device is substantially independent of changes in the viscosity of the liquid.

In the shock absorbers of Figs. 5 to 11 inclusive and Figs. 13 and 14, the thin disc check valve element may be movably supported in any suitable manner, such as by a guide stem 140 extending through the element, and may be limited in its movement away from its seat by a backing member 141 carried by the guide stem. This backing member also performs the function explained above for the annular flange 38, shown in Fig. 1, namely that of preventing undesirable deflection of the thin valve element, when in the open position, by the stream of liquid flowing through the check valve.

Figure 16:
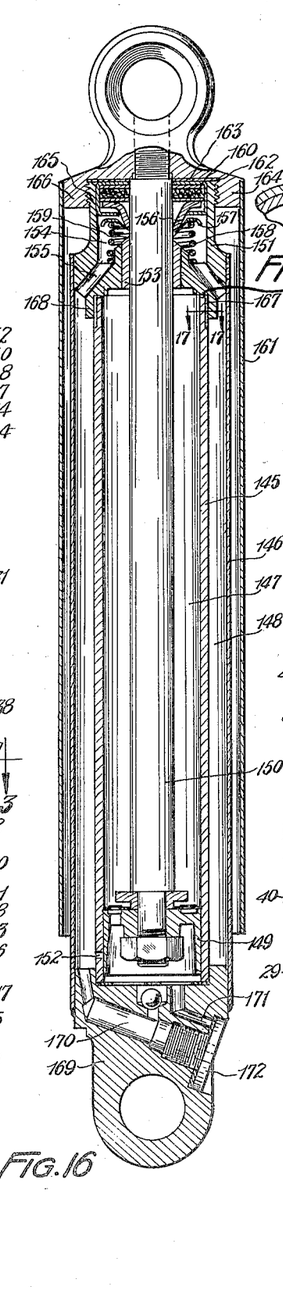
Fig. 16 is a longitudinal sectional view showing still another shock absorber embodying my invention.

In Figs. 16 and 17 of the drawings, I have shown another hydraulic shock absorber which is generally similar to the shock absorber illustrated in Figs. 1 and 2, but which embodies certain additional new and important features. As shown in Fig. 16, this latter form of shock absorber is constructed with coaxial cylinder and reservoir barrels 145 and 146 which provide the device with a working cylinder 147, and with a reservoir 148 around the working cylinder. A piston 149, which is similar as to construction and function to the piston of the device shown in Fig. 2, is actuated by a piston rod 150 extending through the closure plug 151. One or more openings 152, corresponding with the openings 42 of Fig. 2, provide restricted communication between the working cylinder and the reservoir.

One of the novel features of the shock absorber shown in Fig. 16 resides in the provision of improved means for preventing leakage of fluid around the piston rod 150. As shown in the drawings, this rod is slidable in a bearing sleeve 153 and the fluid which leaks outwardly through this sleeve is collected in the chamber 154 and is returned to the reservoir through the passage 155. An elongated flexible sealing washer 156, of substantially conical form, is disposed around the piston rod with the lower end of the washer pressed into scraping engagement with the rod by means of the metal disc 157 and the spring 158. Upon withdrawal of the piston rod from the working cylinder the liquid adhering to the rod surface is scraped therefrom by the washer 156. To provide a similar scraping action upon retraction of the piston rod, that is, upon movement of the rod into the cylinder, I construct the bearing sleeve 153 with a tapered outer end 159. This tapered outer end of the bearing sleeve serves to scrape the liquid from the surface of the rod and readily allows such liquid to flow away from the rod so that there will be no piling up of escaping liquid around the rod, and so that such escaping liquid can be readily returned to the reservoir. The entry of dust or other foreign material into the device around the piston rod is prevented by a felt packing 160 disposed around the rod outwardly of the washer 156, and by the tubular shield 161 which is carried by the piston rod and telescopes around the reservoir barrel 146.

Another feature of this improved shock absorber is the provision of an annular gasket seat 162 on the closure plug 151 for cooperation with a gasket 163 which is carried by a cover member 164 mounted on the piston rod. By pressing the gasket 163 against the gasket seat 162 leakage of fluid from the device can be prevented during such times as the device is in transportation or is being held in storage. The gasket and gasket seat may be conveniently held in sealing cooperation, while the piston rod is in its innermost position shown in Fig. 16, by means of the screw thread portions 165 and 166 provided respectively on the closure plug 151 and the cover member 164.

It is desirable in a device of this kind to expel air from the working cylinder so as to avoid the tendency for the air to create an emulsion with the liquid, and I find that by providing a restricted communicating passage between the upper end of the cylinder and the upper end of the reservoir, air can be forced out of the working cylinder during the normal operation of the device with little or no transfer of liquid through such restricted passage. In Figs. 16 and 17 I have shown this restricted communication in the form of grooves 167 which are preferably cut into the outer surface of the cylinder barrel adjacent its upper end, which grooves communicate with the minute passage 167a formed by the clearance between the cylinder barrel 145 and the plug 151. When these grooves are employed the gasket 19, shown at the upper end of the cylinder barrel in Fig. 2, is omitted and the air displaced from the cylinder during the upward movement of the piston travels around the upper end of the cylinder barrel and downwardly in the grooves between the cylinder barrel and the skirt 168 of the closure plug. During the normal operation of the device, air is forced out of the cylinder and into the reservoir through these grooves, but because of the small area of the grooves and the high friction factor, little or no liquid is displaced from the cylinder through the grooves.

As shown in Fig. 16 the cylinder and reservoir barrels are closed at their lower ends by means of a closure plug 169, and, according to another feature of my invention, I provide this closure plug with a filling passage 170 and a vent passage 171, which passages are so arranged that the device can be readily charged with a predetermined desired volume of liquid. The filling passage 170 corresponds with the filling passage 43 shown in Fig. 2, and is normally closed at its outer end by means of a closure plug 172. The vent passage 171 communicates with the working cylinder 147, at a point corresponding with the desired level to which the device is to be filled with liquid, so that air trapped in the device will prevent the liquid from rising above such point. When the shock absorber of Fig. 16 is to be charged with liquid it is placed with its longitudinal axis in a horizontal plane and liquid is poured in through the filling passage 170. When the liquid rises in the device and covers the inner end of the vent passage 171 it will be seen that a body of air will have been trapped in the device and will prevent any more liquid from flowing in through the passage 170. When this condition occurs the operator knows that the device has been charged with the desired predetermined volume of liquid and the filling passage is then closed by means of the plug 172. If desired this plug may be formed with an enlarged head portion so as to also provide a closure for the vent passage 171.

From the foregoing description and accompanying drawings it should now be readily understood that I have provided a simplified and improved form of hydraulic shock absorber which is very efficient and reliable in operation. It will also be readily seen that by reason of the novel flow control means which I have provided, my improved device operates with a shock absorbing action which is substantially constant, in that it is not subject to variation as the result of changes in the viscosity of the liquid, incident to temperature changes or other causes.

While I have illustrated and described my invention in a detailed manner, it should be understood, however, that I do not wish to be limited to the precise details of construction and arrangements of parts illustrated and described, but regard my invention as including such changes and modifications as do not involve a departure from the spirit of the invention and the scope of the appended claims.

Having thus described my invention what I claim is:—

1. In a shock absorber the combination of cooperating members providing an expansible chamber, and liquid in said chamber adapted to be subjected to pressure by relative movement between said members, one of said members having a passage of restricted area for the discharge of liquid from said chamber, the length of said passage being approximately one-fourth of its minimum plan dimension whereby the rate of flow of the liquid through said passage is substantially independent of viscosity changes in the liquid.

2. In a shock absorber the combination of a body having a liquid chamber therein and an opening for the passage of liquid into or out of said chamber, and a relatively thin element arranged for movement relative to said opening and constituting a check valve for controlling the flow of liquid through said opening, said element having an orifice for a restricted flow of liquid when the check valve is closed to thereby produce a shock absorbing action and said element being of such thinness that the rate of flow through the orifice is substantially independent of changes in viscosity of the liquid.

3. In a shock absorber the combination of a housing having a liquid containing cylinder therein, a piston arranged for oscillation in said cylinder, a piston, actuating shaft having a chamber therein and passages connecting said chamber with the cylinder on opposite sides of the piston, and a movable check valve element in said chamber for controlling the displacement of liquid through said passages by the piston, said valve element being a relatively thin disc and having an orifice for a restricted flow of liquid when the valve element is seated.

4. In a shock absorber the combination of an elongated housing having a working cylinder therein and a reservoir around said cylinder, liquid in said cylinder and reservoir, a piston in said cylinder, means carried by the piston and having an orifice providing a restriction through which liquid is forced as said piston is moved in one direction, and a normally closed valve adjacent one end of said cylinder for discharging liquid from said cylinder into said reservoir when the pressure of the liquid in the cylinder reaches a predetermined abnormal value, in response to the piston movement in said one direction.

5. In a hydraulic shock absorber the combination of a cylinder barrel, a reservoir barrel disposed around said cylinder barrel, means closing said barrels at one end thereof, liquid in the cylinder and reservoir, a piston in the cylinder adapted to cooperate with the liquid to produce a shock absorbing action, said closing means having a skirt portion telescoping a portion of said cylinder barrel, one of said portions having a groove therein providing a restricted air passage connecting the upper end of the cylinder with the reservoir.

6. In a shock absorber the combination of a housing having a cylinder therein, fluid in said cylinder, a piston in said cylinder for displacing said fluid to thereby produce a shock absorbing action, a bearing on said housing, a rod slidable in said bearing for actuating said piston, and means including threaded parts provided respectively on said rod and on said housing outwardly of said bearing for sealing cooperation with each other when said piston is in a retracted position to prevent leakage of fluid from the cylinder around said rod.

7. In a shock absorber the combination of a housing having a cylinder therein, fluid in said cylinder, a piston in said cylinder for displacing said fluid to thereby produce a shock absorbing action, a bearing on said housing, a rod slidable in said bearing for actuating said piston, a sealing part on said housing outwardly of said bearing and extending around said rod, a sealing part movable with said rod and adapted for cooperation with the sealing part of said housing to prevent leakage of fluid around said rod, and means for pressing said sealing parts against each other.

8. In a shock absorber the combination of an elongated housing having a cylinder therein, fluid in said cylinder, a piston in said cylinder for displacing fluid to thereby produce a shock absorbing action, a rod extending into said housing at one end thereof for actuating said piston, a gasket seat on said housing extending around the opening for said rod, a cover part associated with said rod, a gasket on said cover part, and cooperating threaded portions on said housing and cover part for pressing said gasket against said seat.

9. In a shock absorber the combination of a housing having a liquid chamber therein, a piston operable in said housing, means for charging said housing with a desired predetermined body of liquid comprising a filling passage and a vent passage, the latter passage being arranged to trap a body of air in the housing to thereby prevent filling of the housing with liquid beyond the desired extent, and a single closure device for closing both of said passages.

10. In a shock absorber the combination of an elongated housing containing cylinder and reservoir chambers and having a closure member at one end of the housing, said closure member having a filling passage and a vent passage therein with the vent passage arranged to trap air in the housing to prevent filling thereof beyond the desired extent.

JOSEPH E. PADGETT.